(12) United States Patent
Yamaguchi et al.

(10) Patent No.: US 6,758,083 B2
(45) Date of Patent: Jul. 6, 2004

(54) APPARATUS AND METHOD OF DYNAMIC INERTIAL BALANCE FOR GOLF CLUBS

(75) Inventors: Gary T. Yamaguchi, Phoenix, AZ (US); Forest Benjamin Schwatken, Chandler, AZ (US)

(73) Assignee: Arizona Board of Regents, Tempe, AZ (US)

(*) Notice: Subject to any disclaimer, the term of this patent is extended or adjusted under 35 U.S.C. 154(b) by 0 days.

(21) Appl. No.: 10/241,191

(22) Filed: Sep. 11, 2002

(65) Prior Publication Data

US 2003/0046988 A1 Mar. 13, 2003

Related U.S. Application Data

(60) Provisional application No. 60/322,055, filed on Sep. 12, 2001, and provisional application No. 60/318,665, filed on Sep. 11, 2001.

(51) Int. Cl.[7] .................................................. G01M 1/10
(52) U.S. Cl. ............................................ 73/65.03; 73/65.07
(58) Field of Search .......................... 73/65.03, 65.07, 73/65.09, 65.01, 865.3; 473/291, 292

(56) References Cited

U.S. PATENT DOCUMENTS

| | | | | |
|---|---|---|---|---|
| 3,592,053 A | * | 7/1971 | Lucia | 73/66 |
| 4,175,440 A | * | 11/1979 | Booth | 73/865.3 |
| 4,212,193 A | * | 7/1980 | Turley | 73/65.03 |
| 5,656,768 A | * | 8/1997 | Abler et al. | 73/65.07 |

OTHER PUBLICATIONS

Wishon, T. and Meng, J.A., "Game, Set & Match", Golfsmith Clubmaker, Glofsmith International, May 1999, pp. 32–35.

* cited by examiner

*Primary Examiner*—John E. Chapman
(74) *Attorney, Agent, or Firm*—Robert D. Atkins; Quarles & Brady Streich Lang LLP

(57) ABSTRACT

A dynamic inertial balancing system (10) uses a shaft (20) mounted to a base (16). A motor (46) or pulley system (42) imparts rotational torque on the shaft. A swing arm (18) is coupled to the shaft and moves through an arc in a horizontal plane in response to the rotational torque. A golf club is mounted to the swing arm. A timer (38) records the time for the swing arm to traverse the arc. The system balances the golf clubs within a set by measuring their moments of inertia. Each golf club is placed on swing arm 18 and the time is measured for the each golf club to complete the swing arc. If torque is constant for all clubs, then by comparing the moments of inertia, i.e. by comparing the time for each club to complete the swing arc, the club set can be balanced.

19 Claims, 3 Drawing Sheets

US 6,758,083 B2

APPARATUS AND METHOD OF DYNAMIC INERTIAL BALANCE FOR GOLF CLUBS

CLAIM TO DOMESTIC PRIORITY

The present non-provisional patent application claims priority to provisional application serial No. 60/322,055, entitled "Dynamic Inertial Balance for Golf Clubs," filed on Sep. 12, 2001, by Gary T. Yamaguchi, et al. and to provisional application serial No. 60/318,665, entitled "Dynamic Inertial Balance for Golf Clubs," filed on Sep. 11, 2001, by Gary T. Yamaguchi, et al.

FIELD OF THE INVENTION

The present invention relates in general to an apparatus for maintaining recreational or sports equipment and, more particularly, to a dynamic inertial balance apparatus for use in balancing recreational equipment such as golf clubs.

BACKGROUND OF THE INVENTION

Many types of recreational or sports equipment such as golf clubs require balancing for optimal performance. Golf clubs typically come in a set with each club having a different length, head weight, head angle, etc. The golfer uses a specific club of choice for the shot at hand. An important aspect of successful golf play and lower scores is the repeatability of the golf swing which in part comes from an understanding of how each golf club will perform during the swing. By balancing the golf club set, the golfer gains confidence in knowing how each club will respond during the swing. The preferred scenario for most golfers is to have the ability to pull any club from their bag, swing their normal swing, and hit the ball near the intended target. Having one or more clubs which swing or perform significantly different from the other clubs is undesirable and can cause problems for many golfers.

In the prior art, a swing weight scale has been used to balance golf clubs. The amount of handle weight versus head weight is known as the swing weight. The swing weight method is a static measurement of the gravitational moment for a golf club pivoting about a fulcrum which, for many club designs, is located about 36 centimeters from the butt end of the club. To implement the swing weight method, the golf club is placed horizontally on a static balancing scale. The static balancing scale is adjustable so that the product of head weight times distance from the fulcrum to the center of mass of the head side of the club is equal to the product of handle weight times distance from the fulcrum to the center of mass of the handle side of the club. The adjustment feature of the static balancing scale adds weight, typically to the handle side of the fulcrum, to balance the gravitational moment of the golf club.

The swing weight method provides an indication as to the weight of the club head in relation to the weight of the handle end, i.e. head-heaviness or head-lightness. Each of the golf clubs in the set can be measured or tested to determine the variability over the set between head-heavy and head-light. Some golfers prefer that each club in the set possess the same gravitational moment, i.e. same swing weight for each club. Other golfers desire to establish a preferred and known profile of gravitational moments over the set. The optimal balancing of golf clubs is very personal for each user.

The static swing weight balancing scale takes into account the ratio of head weight to handle weight and distance from the fulcrum to the center of mass of each side of the golf club. Unfortunately, with the advent of new materials and designs in golf clubs, such as longer graphite shafts and greater variability in head weights, the balancing scale being a static measurement device does not accurately account for other important features of the golf club which affect its motion during the swing such as different materials, different lengths, and different mass distributions. For instance, two clubs can have exactly the same swing weight, but have dramatically different total weights or weight distributions which will result in significant variability in swing performance.

SUMMARY OF THE INVENTION

In one aspect the present invention is a dynamic inertial balancing system which comprises a base and a shaft mounted to the base with freedom to rotate. A rotational mechanism is coupled to the shaft to impart rotational torque on the shaft. A swing arm is adapted for mounting a golf club, oriented in a horizontal plane, and coupled to the shaft to cause the swing arm to traverse a redetermined arc in the horizontal plane. The golf club is positioned a predetermined distance from the shaft to measure mass moment of inertia of the golf club as a function of time needed to traverse the predetermined arc.

In another aspect, the present invention is a golf club balancing system, comprising a base and a shaft mounted to the base with freedom to rotate. A rotational mechanism is coupled to the shaft to impart rotational torque on the shaft. A swing arm is coupled to the shaft and adapted for mounting a golf club with first and second brackets to cause the golf club to traverse a predetermined arc in the horizontal plane. A swing start mechanism detects the swing arm at a start position of the predetermined arc. A swing stop mechanism detects the swing arm at a finish position of the predetermined arc to measure mass moment of inertia of the golf club as a function of time needed to traverse the predetermined arc.

In yet another aspect, the present invention is a method of balancing a golf club, comprising the steps of mounting a first golf club to a swing arm connected to a shaft, applying a rotational force to the shaft to rotate the swing arm through a predetermined arc in a horizontal plane, starting a timer as the swing arm leaves a start position of the predetermined arc, and stopping the timer as the swing arm arrives at a finish position of the predetermined arc to measure mass moment of inertia of the golf club as a function of time required for the swing arm to traverse the predetermined arc.

DETAILED DESCRIPTION OF THE DRAWINGS

Figure 1:
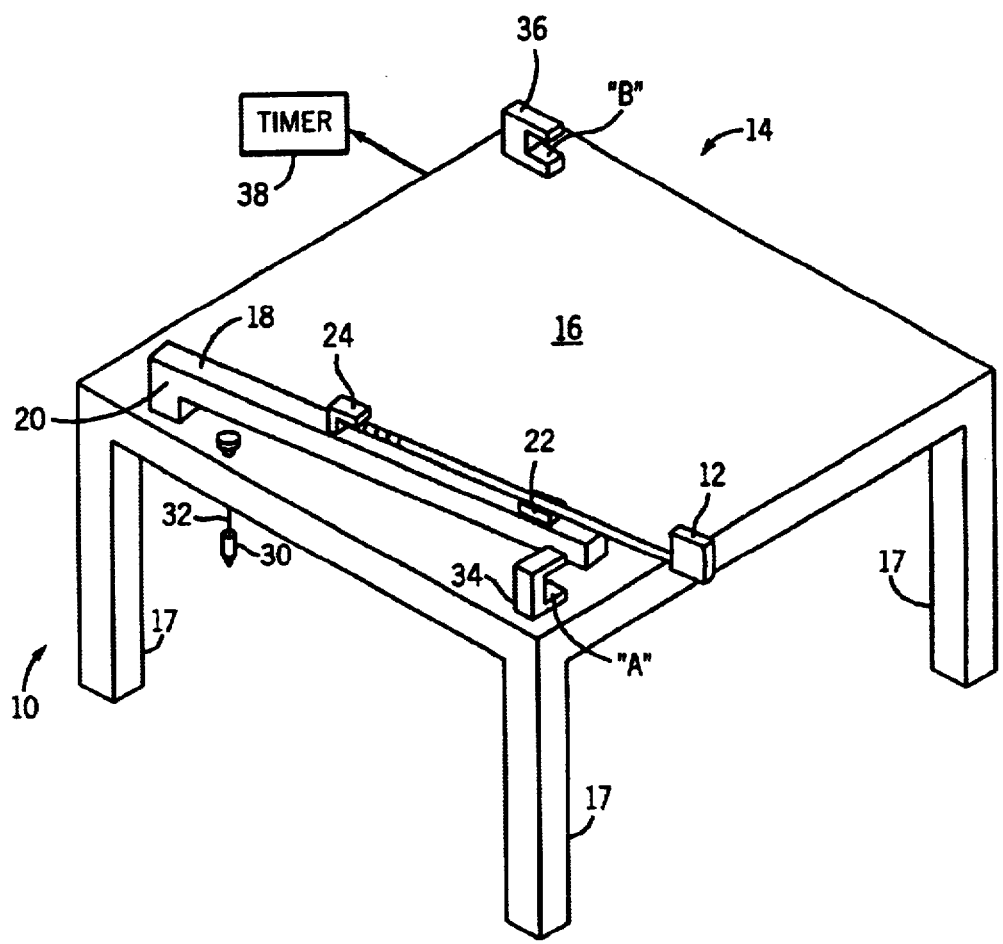
FIG. 1 illustrates a dynamic inertial balancing system for golf clubs.

A dynamic inertial balancing system 10 is shown in FIG. 1 for balancing and maintaining recreational or sports equipment. In one embodiment, dynamic inertial balancing system 10 is useful to measure the dynamic swing characteristics of golf clubs made of dissimilar materials and having dissimilar weights and weight distributions. Golf club 12 is horizontally mounted to swing table 14. Golf club 12 is accelerated at a constant rate from a motionless start position through a predetermined swing arc to a finish position. The time for golf club 12 to traverse the predetermined swing arc is measured. The relative time for each golf club to traverse the swing arc provides a measure of the moment of inertia which is used to dynamically balance the clubs.

The phrases "dynamically balanced" and "inertially balanced" are synonymous, and "dynamic inertial balancing" describes the process of bringing golf clubs into balance with one another. Each club can be adjusted by changing head weight, shaft length, or grip to achieve the same dynamic inertial balance (same time to traverse the arc), or a known profile of dynamic inertial balances, over the golf club set.

Swing table 14 has a solid, rigid, flat metal base 16 with four support legs 17. Support legs 17 include adjustable screws and feet to allow swing table 14 to be leveled. Swing base 16 is a 0.32 cm steel plate measuring 91 cm square. A 38 cm by 38 cm steel plate 19, see FIG. 2, that is 1.27 cm thick is mounted on the underside of base 16 and aligned with its side walls proximate to shaft 20, where the stresses are greatest during operation. There are also three stiffeners (not shown) mounted on underside of base 16 each made of 1.27 cm angle iron and emanating radially outward from the location of shaft 20 at 0 degrees, 45 degrees, and 90 degrees, respectively.

A swing rod or arm 18 is mounted on a stainless steel shaft 20 which protrudes through swing base plate 16. Swing arm 18 is made with a stiff construction of 1.9 cm rectangular tubing and a lightweight material such as aluminum, graphite, titanium, steel, composite matrix, or other suitable material having sufficient strength and stiffness characteristics to hold golf club 12 in a substantially horizontal plane during the swing motion.

Swing arm 18 includes brackets for mounting golf club 12. The shaft of golf club 12 rests on V-notch 22, and the handle of golf club 12 tucks under angled or curved hood 24. V-notch 22 and hood 24 are made of 1.9 cm aluminum angle. Hood 24 is configured as an upside down "V" which is welded to a vertical support. A vertical support wall creates a well-defined face against which the butt end of golf club 12 is placed. V-notch 22 is disposed at the distal end of swing arm 18 and is configured to receive the shaft of golf club 12 such that V-notch 22 in combination with hood 24 hold the club in a horizontal plane during the swinging action.

The center axis of shaft 20 is positioned 33.9 cm from the portion of hood 24 against which the butt end of golf club 12 is placed. Shaft 20 is designed to rotate such that swing arm 18 starts at position A and traverses a 90 degree arc to finish at position B as shown in FIG. 1. The center axis of shaft 20 is maintained in a vertical orientation with respect to base 16 throughout the swing.

A hanging weight 30 is attached to shaft 20 by non-elastic Spectra string or cord 32. When weight 30 is released, gravity exerts a downward force on weight 30 which is translated into a constant eccentric load or angular torque on shaft 20 which in turn creates a constant torsional moment on swing arm 18. Shaft 20 rotates in the counter-clockwise direction and causes swing arm 18 and golf club 12 to start from a motionless state at position A and accelerate at a constant rate through a 90 degree arc to finish at position B.

Other angular distances may be used. For example, the swing arc may be made greater than 90 degrees provided swing arm 18 remains in the same horizontal plane throughout the arc. Alternatively, the swing arc may be made 30 degrees or less provided the rate of acceleration remains constant. In any case, the same angular torque and same angular distance should be used for every measurement of each golf club in the set.

Starter interrupter 34 and finish interrupter 36 are electrically coupled to electronic timer 38. Swing arm 18 starts from rest in physical contact with starter interrupter 34 at the 0 degree position. Starter interrupter 34 includes a light emitting diode (LED) or other sensor to detect when swing arm 18 has started its swing motion. Start interrupter 34 is a U-shaped bracket in which one side emits infrared light and the other side detects the emitted light. Timer 38 will not start while the light transmission is blocked. As swing arm 18 leaves contact with starter interrupter 34, or is otherwise detected as starting its swing motion, an electrical signal is sent to timer 38 to begin timing the swing. Finish interrupter 36 includes an LED or other sensor to detect when swing arm 18 has finished its swing motion. As swing arm 18 makes physical contact with finish interrupter 34, or is otherwise detected as finishing its swing motion, an electrical signal is sent to timer 38 to stop timing the swing. At the conclusion of the swing, timer 38 has recorded the duration of time for swing arm 18 to traverse the 90 degree arc from position A to position B, i.e. the duration of the swing arc from start to finish. Electronic timer 38 provides a display readout in milliseconds.

Dynamic inertial balancing system 10 uses the mass moment of inertia of golf club 12, centered about a point 33.9 cm from the butt end of the club, as the measurable parameter that is used to give each golf club a dynamic performance measurement during the golf swing. Other distances, e.g. up to say 50 cm, would also provide a suitable point to determine the mass moment of inertia.

The dynamic inertial balance has two major components: swing arm 18 upon which golf club 12 is mounted, and base 16 which defines the allowable area for the swing. To compare the dynamic characteristics of two or more golf clubs, each club is placed upon swing arm 18 and measured separately, starting each from rest and timing the period for the swing arm to traverse the fixed arc. The relation between the mass moments of inertia and the times for swing arm 18 to traverse the fixed angular distance is given by the following equation:

$$I_1/I_2 = (t_1/t_2)^2 \qquad (1)$$

wherein $I_1$ is the mass moment of inertia of the first club to be measured about the 33.9 cm point, $I_2$ is the mass moment of inertia of the second club to be measured about the 33.9 cm point, and $t_1$ and $t_2$ are the times needed to traverse the swing arc for the first and second clubs, respectively.

Dynamic inertial balancing system 10 uses equation (1) to balance the golf clubs within a set by measuring the moment of inertia of each golf club. The moments of inertia of any number of clubs are measured by comparing the time needed for each club to swing from rest through the fixed angular distance. The measurement is dynamic in that the club undergoes an acceleration through the swing arc during the test.

A first golf club is placed on swing arm 18 and the time is measured for the first golf club to complete the swing arc. A second golf club is placed on swing arm 18 and the time is measured for the second golf club to complete the swing arc. This process is repeated for each club in the set. If torque is constant for all clubs, then by comparing the moments of inertia, i.e. by comparing the time for each club to complete the swing arc, the club set can be balanced. Additional weight, e.g. lead tape, can be added to the clubhead, shaft, or grip to adjust the club moment of inertia. The test is performed, the results are analyzed, weight is added or removed, and the test is repeated until the desired results are achieved. Each club can be adjusted by changing head weight, shaft length, or grip to achieve the same dynamic inertial balance (same time to traverse the arc), or a known profile of dynamic inertial balances, over the golf club set. For some golfers, each club will have the same moment of inertia, i.e. the same time to complete the swing arc. Other golfers will prefer some known profile of moments of inertia according to their particular tastes.

Other tests can be performed using dynamic inertial balancing system 10 such as determining the absolute mass moment of inertia about the 33.9 cm point. The absolute mass moment of inertia can be quantified by comparing the swing times of each golf club to an object of known moment of inertia, such as a test rod or a test pipe of known mass and dimension.

Figure 2:
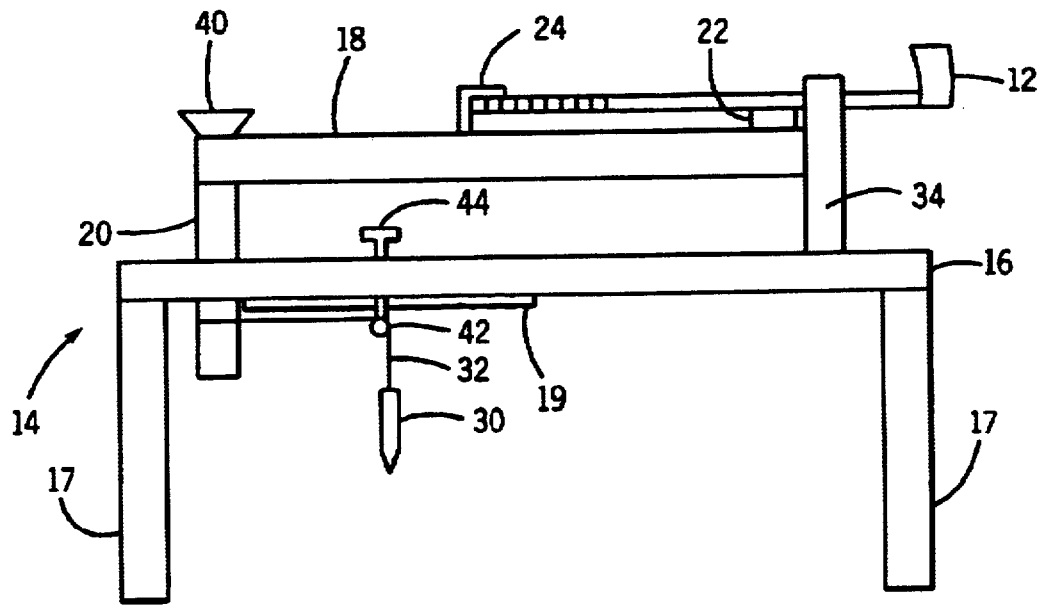
FIG. 2 illustrates a side view of the dynamic inertial balancing system with a rotational mechanism.

A side view of swing table 14 is shown in FIG. 2. Elements which perform the same function are given the same reference number used in FIG. 1. The butt end of golf club 12 is 33.9 cm from the centerline axis of shaft 20. A bubble balance 40 is mounted to the top of shaft 20 to establish vertical alignment. Cord 32 is wrapped around shaft 20 (one turn or less), over pulley 42, and attached to weight 30. Pulley 42 is held in place by release mechanism 44. When pulley 42 is released by release mechanism 44, weight 30 drops at a constant acceleration, i.e. under the influence of gravity. Weight 30, string 32, and pulley 42 operate as a rotational mechanism to impart angular torque on shaft 20. Shaft 20 rotates and creates a constant torsional moment on swing arm 18. Swing arm 18 and golf club 12 start motionless in contact with start interrupter 34 and accelerate at a constant rate through a 90 degree arc until it stops at finish interrupter 36.

A magnetic strip may be mounted to swing arm 18 to cause the swing arm motion to be arrested and come to a complete stop upon making contact with finish interrupter 36. The magnet strip is relatively weak so that it has effect over a very short range and does not significantly affect the motion of swing arm 18. An energy absorbing foam underlayment is added underneath the magnetic strip to prevent swing arm 18 from bouncing as it makes contact with finish interrupter 36 at the conclusion of the swing motion.

Figure 3:
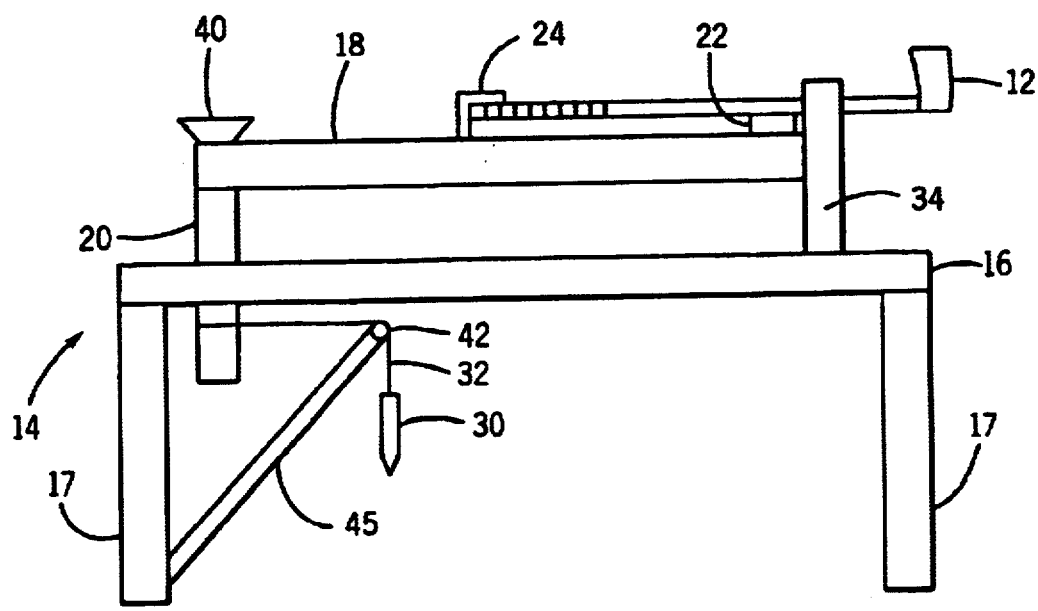
FIG. 3 illustrates a side view of the dynamic inertial balancing system with an alternate support for the rotational mechanism.

In an alternate embodiment as shown in FIG. 3, the release mechanism is shown as square steel brace 45 attached to base 16 and oriented at 30 degrees to the vertical. Brace 45 supports pulley 42 and allows the pulley and roller bearing to be mounted with its upper rim at the same horizontal level as a hole drilled through shaft 20 for string 32. The plane of the pulley is offset slightly from the axis of shaft 20, and is aligned with the string emanating from the outside radius of shaft 20. Brace 45 includes a release mechanism to release pulley 42.

Shaft 20 is manufactured as a 30.5 cm stainless steel shaft with three low friction roller bearings mounted within a chrome-moly steel tube. The three roller bearings maintain shaft 20 in a substantially vertical position as it rotates. Good quality bearings with tight tolerances are preferred as anything less than absolute vertical, e.g. caused by deformation in bearings, can induce error in measurement. The roller bearings may be ABEC 7 ball bearings or of other similar type used for example in roller blade applications.

It is desirable to maintain the same motion of swing arm 18 as the moment of golf club 12 is increased, i.e., when balancing different weighted clubs within a set, to preclude friction effects of the roller bearings from decreasing the accuracy of the measurements. Friction is created between the roller bearings and the races and side walls of the bearings. If the axis of shaft 20 bends slightly, it may also cause the bearings to bind. To counteract these effects, it may be desirable to counterbalance swing arm 18, which will reduce both friction and bending effects. Moreover, as additional mass is added to swing arm 18, there is a need to perform the counterbalancing to avoid decreasing the sensitivity and accuracy of the measurements.

Since roller bearings have some inherent play 0.005 cm brass shims may be placed between shaft 20 and inside bearing diameter to tilt shaft 20 slightly away from vertical, and in a direction which was opposite to the gravitational moment imposed by the mass of golf club 12 and swing arm 18. When golf club 12 is placed on swing arm 18, shaft 20 is pulled back to the vertical, and thus a more vertically centered shaft axis orientation is maintained.

Other alternatives include designing the axle support to operate without roller bearings, which have inherent within them a small amount of play. A jewel type bearing can be used instead which has substantially no play and can be adjusted to be absolutely vertical throughout the motion.

The stiffening plate and/or stiffening ribs on the underside of swing base 16 reduce the bending of the steel plate, particularly in the vicinity of the vertical chrome-moly tube, to help maintain the axis of shaft 20 in a position as vertical as possible throughout the swing motion. The addition of golf club 12 to swing arm 18 creates a large gravitational bending moment on shaft 20, which tends to bend the chrome-moly tube toward golf club 12 and deflect base plate 16. Adverse effects are minimized by reducing any distortion of base plate 16.

As an alternative method for maintaining the stiffness of base plate 16 and chrome-moly tube in shaft 20, stiffening fins made of 0.32 cm steel plate are welded to both the top of base plate 16 and chrome-moly tube. The stiffening fins are oriented vertically and designed to tie the upper portion of the chrome-moly tube rigidly to base plate 16. Several stiffeners should be distributed in angular position around the chrome-moly tube. Each stiffener should be able to resist the bending loads without deflecting.

Figure 4:
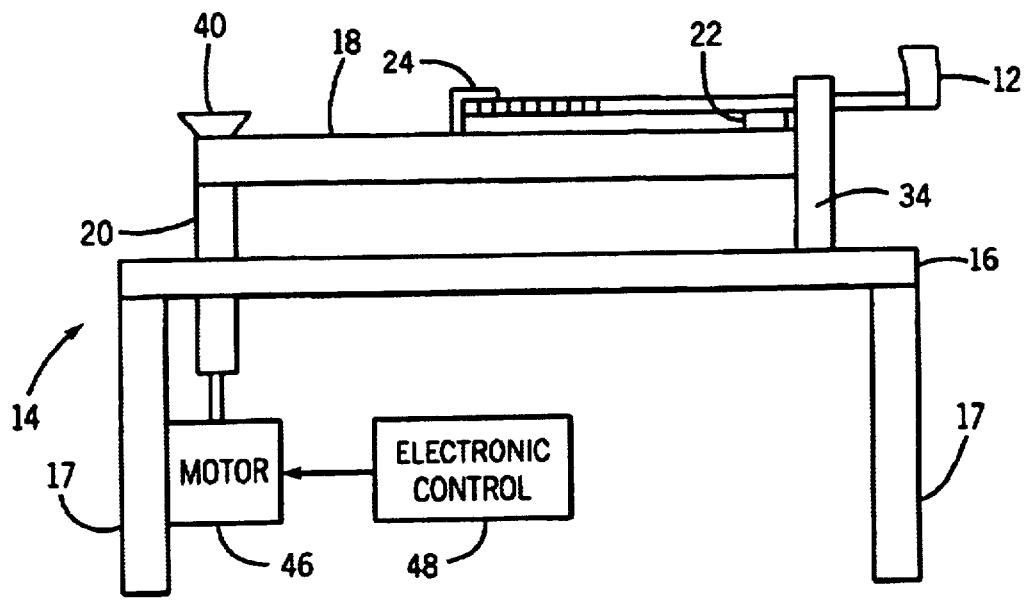
FIG. 4 illustrates an alternate embodiment for the rotational mechanism.

Turning to FIG. 4, another side view of swing table 14 is shown. Elements which perform the same function are given the same reference number used in FIGS. 1 and 2. A motor 46 is mounted to swing table 14 to drive shaft 20 with a constant angular torque. An electronic control circuit 48 controls motor 46. Motor 46 is a convenient, controllable, and mass-producible rotational mechanism.

Figure 5:
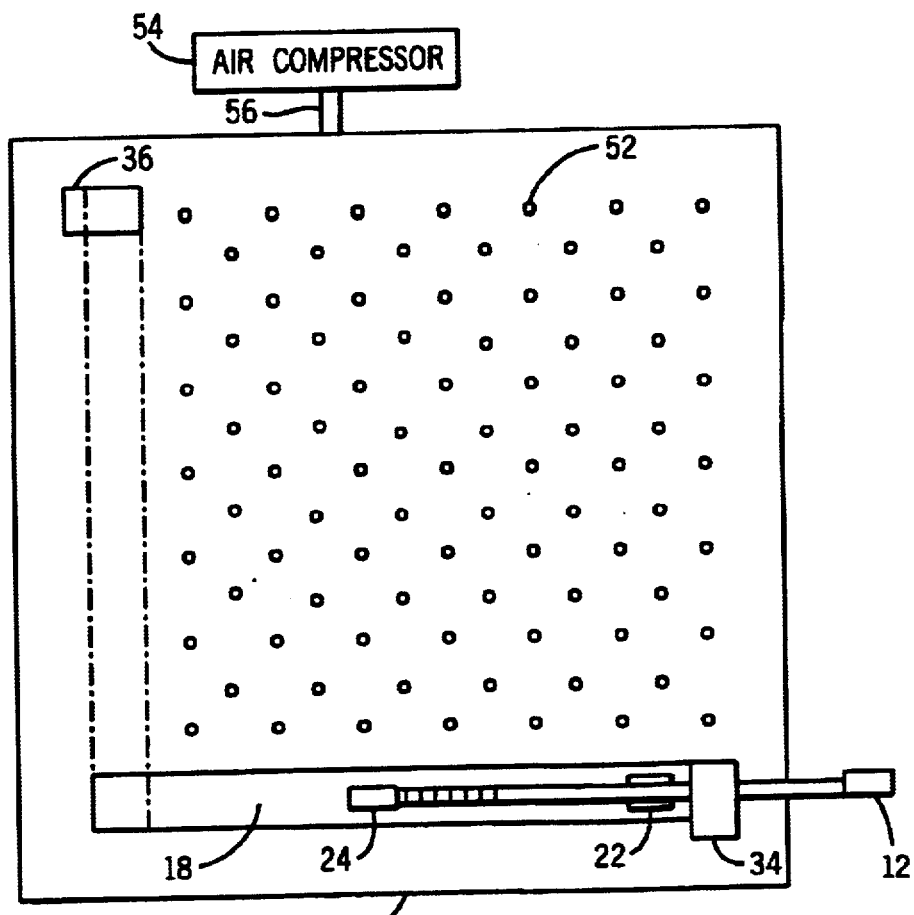
FIG. 5 illustrates a dynamic inertial balancing system with air holes in the surface of the base to reduce friction and support the swing arm in a horizontal plane.

An alternate embodiment of swing table 14 is shown with a top view perspective in FIG. 5. Base 50 includes a plurality of holes or openings 52. An air compressor 54 provides a constant flow of air through tubing 56 to base 50 where it is routed to and released or exhausted through holes 52. Swing arm 18 rests on a cushion of air slightly above base 50 during its swing motion from start interrupter 34 to finish interrupter 36. The air pressure provides a reduced frictional surface while base 50 keeps swing arm 18 in a horizontal plane.

Golf is a very difficult game to learn and to play because there are so many variations in conditions and the effect of a small error during a swing is magnified. There are variations in conditions that are outside the control of the golfer and those that are within his/her control. Those that are within a person's control concern the swing itself which is subject to variation, and the clubs which are swung. The tolerances and variations allowed during both manufacturing and assembly of golf clubs are too great to ensure that all golf clubs within a set will have the same dynamic performance, and thus most discriminating players attempt to balance their own clubs by trial and error by affixing lead tape to the clubhead, shaft, or grip. This process takes time, is inaccurate, and must be repeated every time the grips are replaced. Differences of 1 gram or less in the clubhead, or 2 grams in the grip are noticeable to a good player.

There are variations in club length, loft, lie, weight, mass distribution, grip size, shaft stiffness, flex point, etc. Most players purchase shafts with similar stiffness and are fitted to the correct lengths and specifications. But many golfers purchase drivers made with ultralight and extra long shafts, and expect them to be compatible with their steel shafted iron clubs. Most golfers change the way they swing their clubs depending on which club is being used at the moment, but this reduces the likelihood that they will develop a repeating swing with little variation which is the goal of all golfers.

Compounding the difficulty is that successive shots during an actual game usually require the user to change clubs and to count the first shot hit with each different club. Because second chances are not given, the golfer is not given an opportunity to adapt to the next club selected before he/she has a chance to hit the ball in play. If variations in the dynamic performance of clubs can be minimized or even eliminated, then the major remaining variation is the swing to swing variation during a round of golf. If all clubs provided the same dynamic performance, then the player would receive consistent feedback regarding his/her swing and has the opportunity to modify their swing in response.

An advantage of dynamic inertial balancing system 10 is that it measures the moment of inertia in a horizontal plane and does not require the club's mass and center of mass location to be measured separately. A pendulum method using a small angle deviation from vertical can also be used to measure the moment of inertia, but requires the frequency of oscillation, the mass of the club, and the center of mass location to be measured separately and input to an equation to compute the moment of inertia.

Dynamic inertial balance system 10 matches the dynamic swing characteristics and dynamic performance of a set of golf clubs. It allows clubs within the set to be balanced to each other, and also allows clubs made of dissimilar materials and with different weights and weight distributions to be matched to the other clubs. Clubs that have similar dynamic swing characteristics will be oriented at the same angles at impact, will have the same direction of clubhead velocity, and will provide consistent, clean contact between the golf ball and the club given the same swing as performed by the player.

The advantage to the golfer who uses a set of clubs that have been dynamically balanced is that the mechanical variations inherent within a set of clubs can be minimized or eliminated. Every club will respond the same way when swung, which means that all the clubs will give the player the same feedback regarding the swing.

Another advantage provided by the dynamic inertial balance is that golfers will be able to make or reshaft their clubs using the lightest possible shafts and grips. Ordinarily, clubs that are too light in the shaft and grip tend to be difficult for a person with a strong swing motion to control. Heavier grips are useful in slowing down a players arm swing, which may be too fast in its angular motion in relation to the club. However, laboratory simulations have proven that the lighter a club is, the faster the clubhead will travel through the point of impact. Through dynamic balancing, and by taking weight away from the shaft and grip and putting some of it behind the clubhead, the club itself can be made as light as possible, and the heads can be made as heavy as possible, without a player losing control. This will enable clubs to be made that can deliver both greater distance and greater consistency with the same swing.

Golf club manufacturers will be able to sort their clubs according to dynamic measurements made on the clubs using the dynamic inertial balance. The sorted clubs can be placed into bins with different moment of inertia ranges, and later grouped together to make sets with consistent dynamic performance. By sorting clubs as they come off the assembly line, no alterations need to be made to the clubs themselves.

It is also possible that weight can be added to or taken away from clubheads within an already manufactured set that are not inertially balanced. This would provide a way for a manufacturer to put the finishing touches to a set prior to shipment. It is also a way that a shop specializing in club fitting and adjustments can tune up a set of clubs, or match a set of woods made of high-tech materials to a set of irons made with standard steel shafts.

Although the present invention has been described with respect to preferred embodiment(s), any person skilled in the art will recognize that changes may be made in form and detail, and equivalents may be substituted for elements of the invention without departing from the spirit and scope of the invention. Therefore, it is intended that the invention not be limited to the particular embodiments disclosed for carrying out this invention, but will include all embodiments falling within the scope of the appended claims.

What is claimed is:

1. A dynamic inertial balancing system, comprising:
   a base;
   a shaft mounted to the base with freedom to rotate;
   a rotational mechanism coupled to the shaft to impart rotational torque on the shaft; and
   a swing arm, adapted for mounting a golf club, oriented in a horizontal plane, and coupled to the shaft to cause the swing arm to traverse a predetermined arc in the horizontal plane, wherein the golf club is positioned a predetermined distance from the shaft to measure mass moment of inertia of the golf club as a function of time needed to traverse the predetermined arc.

2. The dynamic inertial balancing system of claim 1, wherein the swing arm includes first and second mounting brackets.

3. The dynamic inertial balancing system of claim 2, wherein the swing arm is adapted for mounting the golf club on the first and second mounting brackets.

4. The dynamic inertial balancing system of claim 1, further including a timer responsive to movement of the swing arm for recording a period of time for the swing arm to traverse the predetermined arc.

5. A dynamic inertial balancing system, comprising:
   a base;
   a shaft mounted to the base with freedom to rotate;
   a rotational mechanism coupled to the shaft to impart rotational torque on the shaft;
   a swing arm coupled to the shaft to cause the swing arm to traverse a predetermined ar;
   a timer responsive to movement of the swing arm for recording a period of time for the swing arm to traverse the predetermined arc;

a first interrupter adapted for detecting the swing arm at a start position of the predetermined arc and providing a start signal to the timer; and a second interrupter adapted for detecting the swing arm at a finish position of the predetermined arc and providing a stop signal to the timer.

6. The dynamic inertial balancing system of claim 5, wherein the shaft includes a bearing to reduce friction during rotation.

7. The dynamic inertial balancing system of claim 5, wherein the rotational mechanism includes:

a weight; and a string coupled between the weight and the shaft to impart rotational torque on the shaft.

8. The dynamic inertial balancing system of claim 5, wherein the rotational mechanism includes a motor coupled to the shaft to impart rotational torque on the shaft.

9. The dynamic inertial balancing system of claim 5, wherein the base includes a plate mounted to the base to reinforce stiffness.

10. The dynamic inertial balancing system of claim 5, wherein the base includes:

a source of air pressure; and a surface with a plurality of openings receiving air from the source of air pressure to support the swing arm.

11. A golf club balancing system, comprising:

a base;

a shaft mounted to the base with freedom to rotate;

a rotational mechanism coupled to the shaft to impart rotational torque on the shaft;

a swing arm coupled to the shaft and adapted for mounting a golf club with first and second brackets to cause the golf club to traverse a predetermined arc in the horizontal plane;

a awing start mechanism for detecting the swing arm at a start position of the predetermined arc; and a swing stop mechanism for detecting the swing arm at a finish position of the predetermined arc to measure mass moment of inertia of the golf club as a function of time needed to traverse the predetermined arc.

12. The dynamic inertial balancing system of claim 11, further including a timer responsive to movement of the swing arm for recording a period of time for the swing arm to traverse the predetermined arc.

13. The dynamic inertial balancing system of claim 12, wherein the swing start mechanism provides a start signal to the timer and the swing stop mechanism provides a stop signal to the timer.

14. The dynamic inertial balancing system of claim 11, wherein the shaft includes a bearing to reduce friction during rotation.

15. The dynamic inertial balancing system of claim 11, wherein the base includes:

a source of air pressure; and a surface with a plurality of openings receiving air from the source of air pressure to support the swing arm.

16. A method of balancing a golf club, comprising:

mounting a first golf club to a swing arm connected to a shaft;

applying a rotational force to the shaft to rotate the swing arm through a predetermined arc in a horizontal plane;

starting a timer as the swing arm leaves a start position of the predetermined arc; and stopping the timer as the swing arm arrives at a finish position of the predetermined arc to measure mass moment of inertia of the golf club as a function of time required for the swing arm to traverse the predetermined arc.

17. The method of claim 16, further including the step of comparing the time required for the first golf club to traverse the predetermined arc to the time required for a second golf club to traverse the predetermined arc.

18. The method of claim 16, further including the step of positioning the golf club a predetermined distance from the shaft to measure mass moment of inertia of the golf club.

19. The method of claim 16, including the step of applying a rotational torque to a shaft coupled to the swing arm.

* * * * *

UNITED STATES PATENT AND TRADEMARK OFFICE
Certificate

Patent No. 6,758,083 B2                                                                                 Patented: July 6, 2004

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Gary T. Yamaguchi, Phoenix, AZ; Forest Benjamin Schwatken, Chandler, AZ; and Darrin Richards, Phoenix, AZ.

Signed and Sealed this Twelfth Day of July 2005.

HEZRON E. WILLIAMS
*Supervisory Patent Examiner*
Art Unit 2856